Nov. 2, 1937.  J. P. PUTNAM  2,097,642
ELECTRICAL CONNECTER
Filed Feb. 12, 1936

INVENTOR:
John P. Putnam
BY Geo. K. Woodworth
ATTORNEY

Patented Nov. 2, 1937

2,097,642

UNITED STATES PATENT OFFICE 2,097,642

ELECTRICAL CONNECTER

John P. Putnam, Boston, Mass., assignor to The Reece Button-Hole Machine Company, Boston, Mass., a corporation of Maine Application February 12, 1936, Serial No. 63,526

3 Claims. (Cl. 173—81)

This invention relates to electrical connecters designed especially for connecting the windings of variometers used in radio receivers of the all-wave type such as shown, for example, in my application Serial No. 29,866, filed July 5, 1935, which has matured to Patent No. 2,066,945 dated January 5, 1937 but capable of more general application.

In radio receivers of the type above mentioned, I have found that the inductance of the flat spiral employed for connecting the rotor and stator windings, although relatively quite low, is nevertheless of sufficient magnitude to appreciably reduce the variometer inductance range, or the ratio of its maximum to its minimum inductance.

The object of my invention, therefore, is to provide means of practically negligible inductance for electrically connecting two relatively movable current-carrying members such, for example, as the rotor and stator windings of a variometer.

Figure 1:
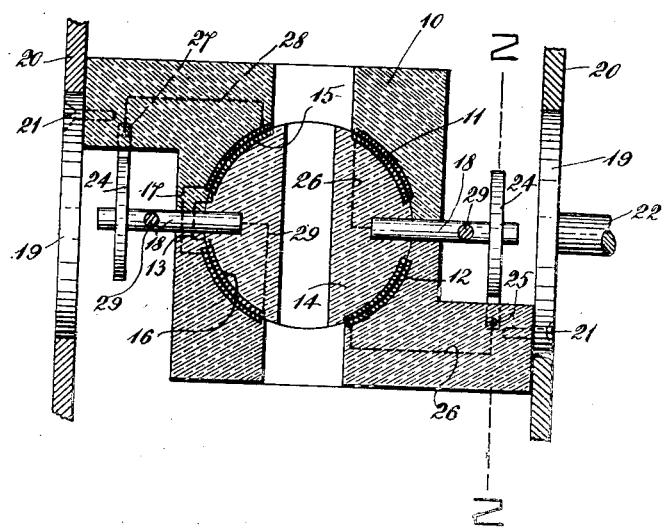

In the drawing which accompanies and forms a part of this specification, Figure 1 is a longitudinal central section of a spherical variometer of the type shown and claimed in my application aforesaid.

Figure 2:
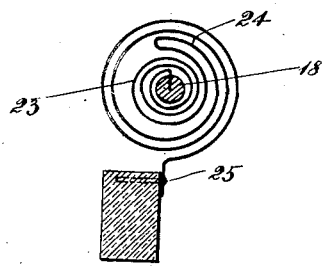

Fig. 2 is a transverse section taken on the line 2—2 of Fig. 1.

In the particular drawing selected for more fully disclosing the principle of my invention, 10 is the rotor frame having a spherical interior surface in which are disposed the rotor windings 11, 12, electrically connected by the wire 13.

On the stator frame 14, herein shown as having a spherical exterior surface, are mounted the stator windings 15, 16, connected in series by the wire 17.

The ends of the gudgeons 18, which enter the stator frame and are rigidly secured thereto, have their bearings in the rotor frame. The variometer rotor frame is mounted by discs 19 in and between a pair of spaced metallic plates 20, 20, said discs being secured by the screws 21 to laterally-extending projections on said frame. A knob or tuning dial (not shown) may be attached to the stud 22.

It will be understood, of course, that the foregoing specific description of a variometer of the type shown in my application above mentioned is included herein solely for the purpose of completeness of disclosure and that my invention is not limited to use therewith and may be used with variometers of any type, and in fact with electrical elements of any sort embodying two relatively movable conductively-connected current-carrying members.

For electrically connecting two relatively movable current-carrying members, such as the rotor and stator windings of a variometer, pigtails, so called, of various types heretofore have been employed, the most effective type being a hair spring or flat spiral of resilient metal electrically and mechanically connected to said members, whereby rubbing contacts are avoided. The inductance of a spiral pigtail, although relatively very small, is nevertheless large enough to prevent the use of a variometer as a tuning element of a circuit tuned to extremely high frequencies. For example, I have found that in one construction embodying the invention of my above mentioned application the maximum frequency to which the circuit including the variometer as one of its tuning elements could be attuned was 20 megocycles, whereas it was desired with the variometer and its serially connected condenser set at their minimum values to tune said circuit to 25 megocycles. It being impracticable further to reduce such minimum values and still tune the circuit to the minimum frequency required, it was necessary to provide the connecter which forms the subject matter of this application and has practically negligible inductance. It is to be understood, however, that the particular illustration of one use of this invention is not to be considered as a limitation and that my improved electrical connecter is applicable to tuning elements and other electrical devices, irrespective of the frequency of the current flowing therein.

The inductance of the flat spiral can be reduced substantially to zero by forming it of two sets of oppositely directed convolutions, as shown in Fig. 2, in which the inner set 23 is shown as consisting of three turns wound or directed counterclockwise and the outer set 24 is shown as having two and a half turns directed clockwise. The inductance of the spiral is substantially zero because the two magnetic fields created by a current of given intensity flowing through the two oppositely directed sets of turns of the spiral are substantially equal in magnitude and opposite in direction. The strength of said magnetic fields depends, among other things, upon the radii vectors of the several convolutions of each set and the number of turns in each. The particular case above specifically described is merely one example of a practically infinite number of arrangements. Generally speaking, the convolutions of the outer set will have a smaller number of turns than the inner because the radii vectors of the outer set necessarily are larger than those of the inner.

The outer end of one flat spiral is secured to the rotor frame by the pin 25 to which one terminal of the rotor winding 12 is connected by the conductor 26. The inner end of the flat spiral is electrically and mechanically connected in any suitable manner to the right-hand metallic gudgeons 18, one of the terminals of the stator winding 15 also being connected to said gudgeon by the wire 26.

Similarly, the outer end of the other flat spiral is secured by the pin 27 to the rotor frame and the outer end of the rotor winding 11 is connected to said pin by the wire 28. The inner end of the left-hand spiral is connected electrically and mechanically to the left-hand gudgeon 18 in the manner shown in Fig. 2 and said gudgeon is connected electrically by the wire 29 to the outer terminal of the stator winding 16. In the present instance, the rotor and stator windings are connected in parallel by the flat spirals, although it will readily be understood that if a series connection is desired one spiral connecter only will be employed. The variometer may be connected to an external circuit in any suitable manner as, for example, by means of pins or binding posts 29, 29, each passing through one of the gudgeons.

I am, of course, aware that conducting members of substantially negligible inductance have heretofore been employed for electrically connecting the rotor and stator windings of variometers, but such connecters are subject to the limitation that the connection involves a rubbing contact and not a soldered joint or mechanical connection.

Having thus described an illustrative embodiment of my invention without, however, limiting the same thereto, what I claim and desire to secure by Letters-Patent is:

1. As an article of manufacture, a means for electrically connecting two relatively-movable current-carrying members consisting of a flat spiral of conducting material having two sets of oppositely-directed serially-connected convolutions, one set surrounding the other and one terminal of said spiral being the inner end of the inner set of convolutions and the other terminal being the outer end of the outer set of convolutions.

2. As an article of manufacture, a means for electrically connecting two relatively-movable current-carrying members consisting of a flat spiral of conducting material having two sets of oppositely-directed serially-connected convolutions, one set surrounding the other and the outer set having a smaller number of turns than the inner.

3. As an article of manufacture, a means for electrically connecting two relatively-movable current-carrying members consisting of a flat spiral of conducting material having two sets of oppositely-directed convolutions, the outer set having a smaller number of turns than the inner, and the relation between the radii vectors and the number of convolutions of the two sets being such that the two magnetic fields created by a current of given intensity flowing therethrough are substantially equal in magnitude and opposite in direction whereby the inductance of said spiral is practically zero.

JOHN P. PUTNAM.